(12) United States Patent
Zhu

(10) Patent No.: US 11,950,224 B2
(45) Date of Patent: Apr. 2, 2024

(54) RESOURCE INDICATION METHOD ON UNLICENSED SPECTRUM, AND TERMINAL

(71) Applicant: BEIJING XIAOMI MOBILE SOFTWARE CO., LTD., Beijing (CN)

(72) Inventor: Yajun Zhu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 326 days.

(21) Appl. No.: 17/481,072

(22) Filed: Sep. 21, 2021

(65) Prior Publication Data

US 2022/0039117 A1 Feb. 3, 2022

Related U.S. Application Data

(63) Continuation of application No. PCT/CN2019/080164, filed on Mar. 28, 2019.

(51) Int. Cl.
*H04W 72/1263* (2023.01)
*H04L 1/1607* (2023.01)
*H04W 72/0446* (2023.01)

(52) U.S. Cl.
CPC ........ *H04W 72/1263* (2013.01); *H04L 1/1614* (2013.01); *H04W 72/0446* (2013.01)

(58) Field of Classification Search
CPC ......... H04W 72/1263; H04W 72/0446; H04W 72/23; H04W 74/0808; H04W 72/121; H04L 1/1614; H04L 5/0048; H04L 5/0053
See application file for complete search history.

(56) References Cited

U.S. PATENT DOCUMENTS

| 10,491,263 | B2* | 11/2019 | Zheng | H04W 16/14 |
| 10,938,531 | B2* | 3/2021 | Ren | H04L 5/0064 |
| 11,064,479 | B2* | 7/2021 | Tang | H04L 5/0051 |
| 11,147,061 | B2* | 10/2021 | Ma | H04L 5/0062 |
| 11,310,756 | B2* | 4/2022 | Tiirola | H04L 1/1819 |
| 11,432,293 | B2* | 8/2022 | Liu | H04W 72/04 |
| 11,546,081 | B2* | 1/2023 | Qu | H04W 72/04 |
| 11,777,680 | B2* | 10/2023 | Ren | H04L 5/0048 370/336 |
| 2019/0289621 | A1* | 9/2019 | Li | H04W 72/1268 |
| 2020/0389916 | A1* | 12/2020 | Salem | H04W 74/006 |
| 2021/0136753 | A1* | 5/2021 | Liu | H04W 72/0446 |
| 2021/0153212 | A1* | 5/2021 | Lin | H04L 27/26025 |

FOREIGN PATENT DOCUMENTS

CN 108174445 A 6/2018

OTHER PUBLICATIONS

PCT/CN2019/080164 English translation of International Search Report dated Jan. 2, 2020, 2 pages.

* cited by examiner

*Primary Examiner* — Habte Mered
(74) *Attorney, Agent, or Firm* — COZEN O'CONNOR

(57) ABSTRACT

A resource indication method for an unlicensed spectrum includes: receiving, by a terminal, a scheduling instruction sent by an access network device; and determining, by the terminal, a first time domain resource according to the scheduling instruction, in which the first time domain resource is a time domain resource configured to transmit data, a start position of the first time domain resource is obtained based on a second time domain resource, and the second time domain resource is a time domain resource configured to send the scheduling instruction.

16 Claims, 8 Drawing Sheets

RESOURCE INDICATION METHOD ON UNLICENSED SPECTRUM, AND TERMINAL

CROSS-REFERENCE TO RELATED APPLICATION

This application is a continuation application of International Application No. PCT/CN2019/080164, filed on Mar. 28, 2019, the entire contents of which are incorporated herein by reference.

TECHNICAL FIELD

The disclosure relates to the field of communication technology, and in particular to a resource indication method on an unlicensed spectrum, and a terminal.

BACKGROUND

Since a channel for transmitting data between a terminal and an access network device is a shared channel, the access network device needs to perform resource scheduling for the terminal. This involves allocating time domain resources to the terminal through resource scheduling, so that the terminal can send uplink data or receive downlink data using the time domain resource.

Taking an indication of the time domain resource as an example, the access network device may pre-configure multiple fixed time domain resources, and then instruct the terminal to transmit data on one of the fixed time domain resources. Taking granularities of the time domain resources as symbols, the time domain resources can be represented by the symbol starting position and the symbol length. As an example, assuming that the starting position of the symbol is 3 and the symbol length is 3, the access network device may instruct the terminal to transmit data on the third to fifth symbols in the time slot. One slot can include 14 symbols.

SUMMARY

In order to solve the problems in the related art, the disclosure provides a resource indication method on an unlicensed spectrum, and a terminal.

Embodiments of the disclosure provide a resource indication method on an unlicensed spectrum. The method includes: receiving, by a terminal, a scheduling instruction sent by an access network device; and determining, by the terminal, a first time domain resource according to the scheduling instruction, in which the first time domain resource is a time domain resource configured to transmit data, a start position of the first time domain resource is obtained based on a second time domain resource, and the second time domain resource is a time domain resource configured to send the scheduling instruction.

Embodiments of the disclosure provide a resource indication method on an unlicensed spectrum. The method includes: sending a scheduling instruction by an access network device to a terminal, in which the scheduling instruction is configured to inform the terminal of a first time domain resource, the first time domain resource is a time domain resource configured to transmit data, and a start position of the first time domain resource is obtained based on a second time domain resource, and the second time domain resource is a time domain resource configured to transmit the scheduling instruction.

Embodiments of the disclosure in a fifth aspect provide a terminal. The terminal includes: a processor and a memory for storing instructions executable by the processor. The processor is configured to: receive a scheduling instruction sent by an access network device; and determine a first time domain resource according to the scheduling instruction, in which the first time domain resource is a time domain resource configured to transmit data, a start position of the first time domain resource is obtained based on a second time domain resource, and the second time domain resource is a time domain resource configured to send the scheduling instruction.

It should be understood that the above general description and the following detailed description are only exemplary and explanatory, and cannot limit the present disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

Continuous emergence of new Internet applications such as AR (Augmented Reality)/VR (Virtual Reality), vehicle-to-vehicle communication creates high demand for wireless communication technologies and drives the continuous evolution of the wireless communication technologies to meet the requirements of the applications. Currently, cellular mobile communication technology is in the evolution stage of a new generation of technology. An important feature of the new-generation technology mentioned here is supporting flexible configuration of multiple service types for various business models. Different service types have different requirements for the wireless communication technologies, for example, eMBB (enhanced Mobile Broad Band) service types mainly require broadband and high speed, t URLLC (Ultra Reliable Low Latency Communication) service type focus on high reliability and low latency, and the mMTC (massive machine type communication) service types are mainly focused on the large linking number. For these examples and others, a new generation of wireless communication systems requires a flexible and configurable design to support the transmission of multiple service types.

Figure 1:
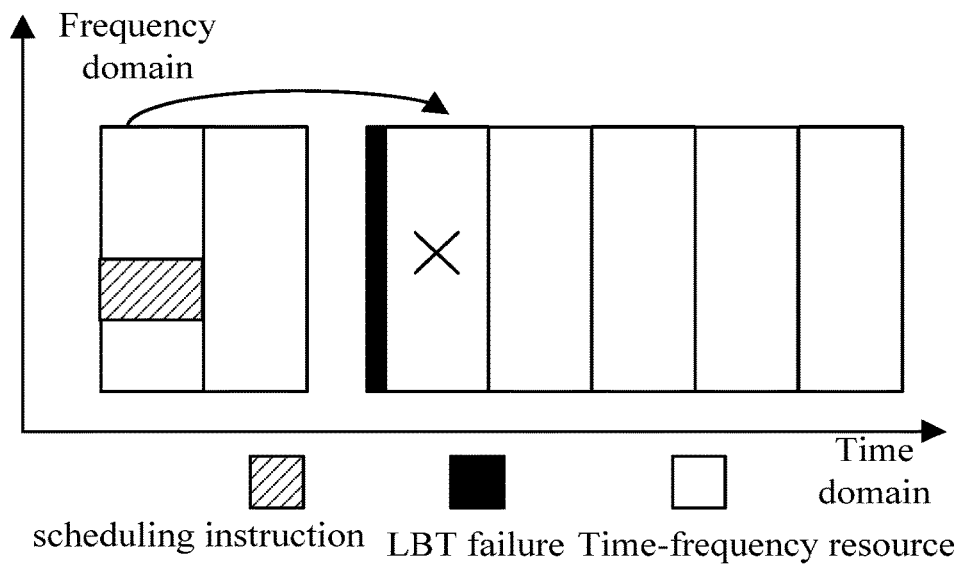
FIG. 1 is a schematic diagram of resource allocation of unlicensed spectrum.

Unlicensed spectrum is a spectrum used according to a competition system. Multiple communication systems can compete for the use of frequency domain resources on the unlicensed spectrum. For example, a WiFi (Wireless Fidelity) system and an LTE system can compete for the use of frequency domain resources on the unlicensed spectrum. If the time-frequency resource allocated to the terminal in the LTE system is the time-frequency resource on the unlicensed spectrum, the channel may be occupied by other communication systems, that is, the channel occupancy is uncertain. Thus, even if a time-frequency resource is allocated to the terminal by the scheduling instruction, the terminal may not be able to successfully occupy the time-frequency resource and is unable to perform data transmission on the time-frequency resource. FIG. 1 illustrates a schematic diagram of resource allocation of unlicensed spectrum, in which the shaded area is a scheduling instruction, the white filled areas are time-frequency resources, and the arrow of the scheduling instruction points to the time-frequency resource allocated to the terminal. Before the terminal occupies the time-frequency resource, a LBT (Listen Before Talk) process is required to be performed, that is indicated by the black filled area. When it is detected that the channel is occupied, that is, the LBT fails, the terminal cannot occupy the time-frequency resource.

In the related art, the access network device instructs the terminal to transmit data on a fixed time domain resource. The granularity of the indication of the time domain resource may be at the symbol level, that is, the granularity of the allocation of the time domain resources scheduled at one time may be at the symbol level. The following takes the access network device and the terminal transmitting data on the PDSCH (Physical Downlink Shared Channel) as an example to introduce the two types of time domain resource mapping of the PDSCH.

The first mapping type is Mapping type A, that is, the time domain resources transmitted via PDSCH start from the $\{0, 1, 2, 3\}^{th}$ symbol locations in a time slot, and the symbol length is 3 to 14 symbols, and cannot cross the boundary of the time slot.

The second mapping type is Mapping type B, that is, the time domain resources transmitted via PDSCH start from the $0\text{-}12^{th}$ symbol locations in a time slot, and the symbol length is $\{2, 4, 7\}$ symbols, and cannot cross the boundary of the time slot.

The following describes the indication mode of the time domain resources of the PDSCH. In the related art, the access network device may first send the configuration table shown in Table 1 to the terminal, which includes the configuration information of the symbol start position S and the symbol length L. Afterwards, the access network device sends the scheduling instruction to the terminal. The scheduling instruction is used to indicate a value of S+L in the configuration table. The terminal determines the time domain resource transmitted via PDSCH based on the scheduling instruction.

TABLE 1

| PDSCH mapping type | Normal cyclic prefix | | | Extended cyclic prefix | | |
|---|---|---|---|---|---|---|
| | S | L | S + L | S | L | S + L |
| Type A | {0, 1, 2, 3} (Note 1) | {3, ..., 14} | {3, ..., 14} | {0, 1, 2, 3} (Note 1) | {3, ..., 12} | {3, ..., 12} |
| Type B | {0, ..., 12} | {2, 4, 7} | {2, ..., 14} | {0, ..., 10} | {2, 4, 6} | {2, ..., 12} |

Note 1:
S = 3 is applicable only if dmrs-TypeA-Position = 3

In the related art, the scheduling instruction instructs the terminal and the access network device to transmit data on the $8^{th}$ to $14^{th}$ symbols in a time slot. If the $9^{th}$ to $14^{th}$ symbols of the access network device in a time slot occupy the channel resources, the terminal and the access network device cannot start transmitting data from the pre-indicated $8^{th}$ symbol in the time slot, that is, it is unable to transmit the pre-defined complete data, resulting in a low data success rate.

In an embodiment, the second time domain resource used to send the scheduling instruction may be determined first, and then the starting position of the first time domain resource used to transmit data is determined based on the second time domain resource. In other words, the starting position of the first time domain resource is determined based on the second time domain resource, which ensures that the starting position of the first time domain resource changes with the change of the second time domain resource, and the starting position of the first time domain resource is set to always be after the second time domain resource. This solves the problem that when data can only be transmitted on a fixed time domain resource if the fixed time domain resource is not successfully occupied the access network device and terminal cannot transmit data on the fixed time domain resource, to achieve the effect of improving the success rate of data transmission.

It should be noted that transmitting data between the access network device and the terminal includes: the access network device sending downlink data to the terminal, and the terminal sending uplink data to the access network device, which will not be described in detail below.

Figure 2:
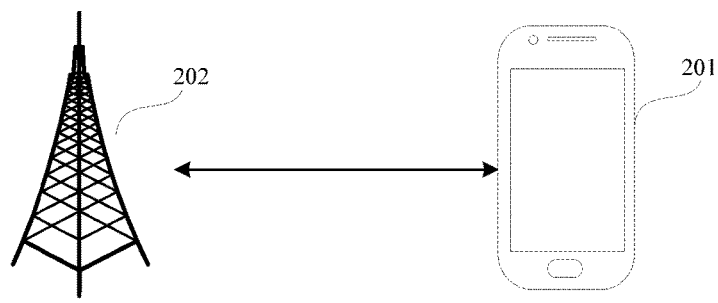
FIG. 2 is a schematic diagram of an implementation environment involved in embodiments of the disclosure.

FIG. 2 is a schematic diagram of a mobile communication system according to an embodiment of the disclosure. The mobile communication system may be a 5G system, also known as an NR (New Radio) system. The mobile communication system includes: an access network device 201 and a terminal 202.

The access network device 201 may be a base station, and the embodiments of the disclosure does not limit the specific implementation manner of the access network device 201. In some embodiment, the access network device 201 may also include a HeNB (Home eNB), a relay, a Pico (Picocell), and the like.

A wireless connection between the access network device 201 and the terminal 202 is established through a wireless air interface. In some embodiments, the wireless air interface is a wireless air interface based on the 5G mobile communication network technology standard, for example, the wireless air interface is a NR (New Radio); or, the wireless air interface may also be a 5G-based wireless air interface of the next generation mobile communication network technology standard.

The terminal 202 may be a device that provides voice and/or data connectivity to the user. The terminal 202 can communicate with one or more core networks via a RAN (Radio Access Network). The terminal 202 can be a mobile terminal, such as a mobile phone (or "cellular" phone) and a computer with a mobile terminal, such as, a portable, pocket-sized, handheld, computer built-in or vehicle-mounted mobile device. The mobile device may be a Subscriber Unit, a Subscriber Station, a Mobile Station, a Mobile, a Remote Station, an Access Point, a Remote Terminal, an Access Terminal, a User Terminal, a User Agent, a User Device, or a User Equipment.

It should be noted that the mobile communication system in FIG. 2 may include multiple access network devices 201 and/or multiple terminals 202. FIG. 2 includes one access network device 201 and one terminal 202, which are not limited in this embodiment.

Figure 3:
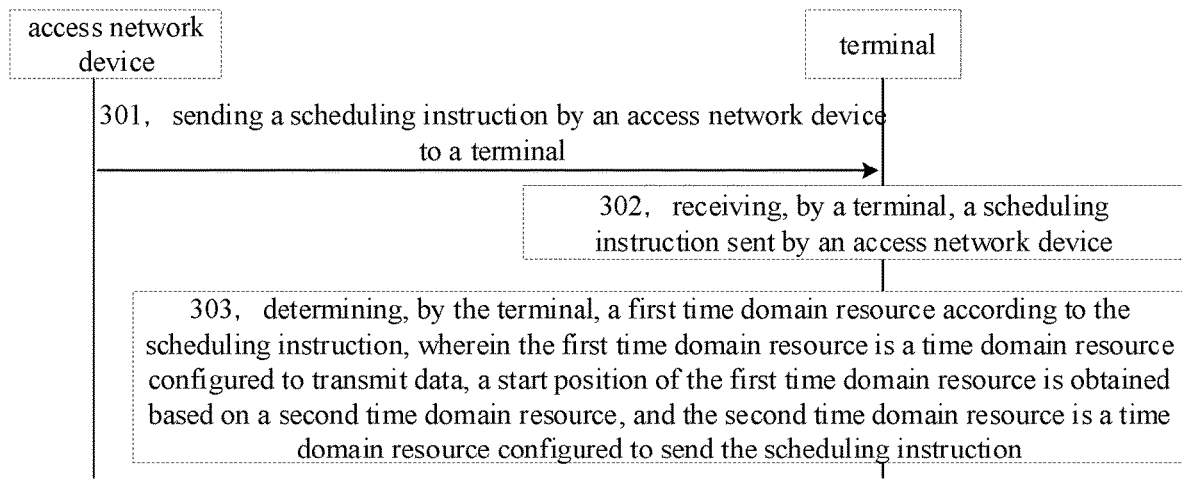
FIG. 3 is a flowchart of a resource indication method on an unlicensed spectrum according to an embodiment of the present disclosure.

FIG. 3 is a flowchart of a resource indication method on an unlicensed spectrum according to an embodiment of the present disclosure. The resource indication method on the unlicensed spectrum is applied in the implementation environment shown in FIG. 2. As illustrated in FIG. 3, the resource indication method on the unlicensed spectrum includes the following.

In step 301, an access network device sends a scheduling instruction to a terminal.

In step 302, the terminal receives the scheduling instruction sent by the access network device.

In step 303, the terminal determines a first time domain resource according to the scheduling instruction, the first time domain resource is the time domain resource used for data transmission, a start position of the first time domain resource is obtained based on a second time domain resource. Alternatively or additionally, the second time domain resource is a time domain resource configured to send the scheduling instruction.

Step 301 can be implemented respectively as an embodiment on the access network device side, and steps 302 and 303 can be implemented respectively as an embodiment on the terminal side.

In conclusion, in the resource indication method on the unlicensed spectrum provided by the disclosure, a scheduling instruction sent by an access network device is received, and the first time domain resource is determined according to the scheduling instruction. The starting position is obtained based on the second time domain resource. The first time domain resource is a time domain resource used for data transmission, and the second time domain resource is a time domain resource used to send the scheduling instruction. In this way, the starting position of the first time domain resource can be set to always be subsequent to the second time domain resource and change with the change of the second time domain resource, which solves the problem that when data can only be transmitted on a fixed time domain resource, if the fixed time domain resource is not successfully occupied, the access network device and terminal cannot transmit data on the fixed time domain resource, which achieves the effect of increasing the success rate of data transmission.

It should be noted that the first time domain resource may be determined by the starting position and the number of symbols contained in the first time domain resource. For example, if the starting position of the first time domain resource is the third symbol in the time slot, and the number of symbols contained in it is 3, then the first time domain resource is the third to fifth symbol in the time slot.

In a possible implementation, the starting position of the first time domain resource may be obtained by shifting based on the second time domain resource, and the reference point and the offset need to be selected when performing the shifting. In this embodiment, the reference point is called the target reference symbol, and the offset is called the offset information. Then, the target reference symbol is used to determine the starting position of the first time domain resource, and the offset information is used to indicate the offset of the starting position of the first time domain resource relative to the target reference symbol. In this embodiment, the number of symbols contained in the first time domain resource may also be referred to as the symbol length. The following respectively introduces the target reference symbol, offset information and symbol length.

1. Target Reference Symbol

Figure 4:
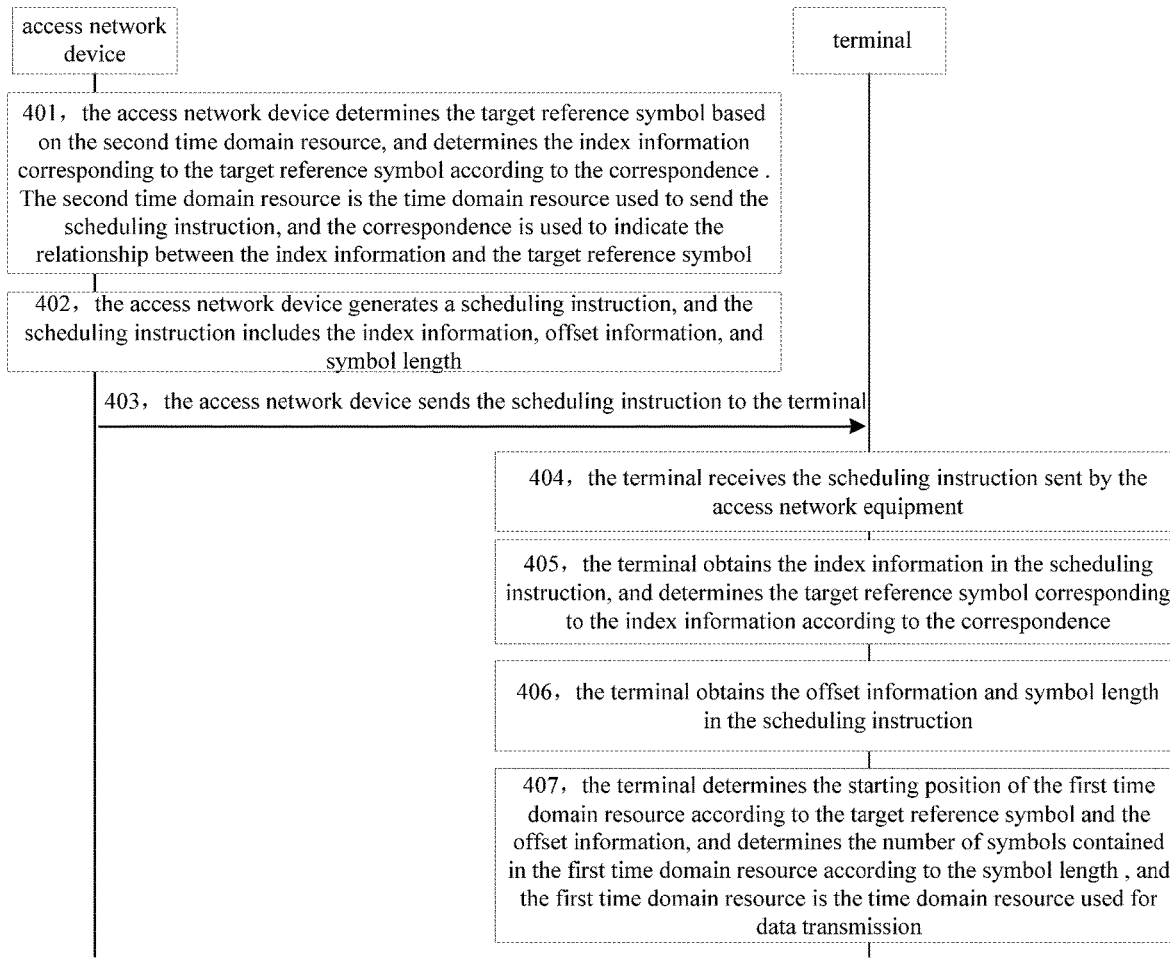
FIG. 4 is a flowchart of a resource indication method on an unlicensed spectrum according to an embodiment of the present disclosure.
Figure 6:
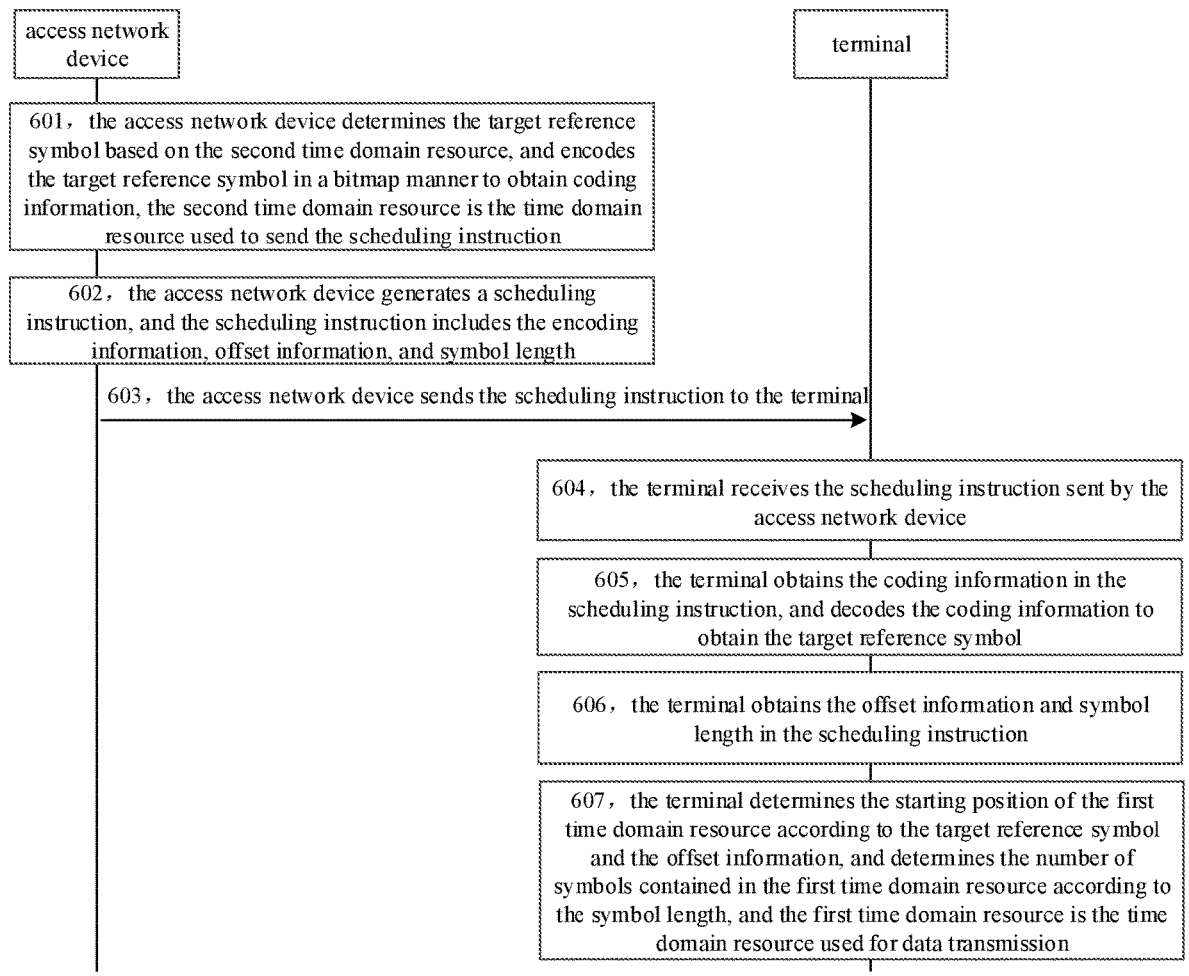
FIG. 6 is a flowchart of a resource indication method according to an embodiment of the present disclosure.

The target reference symbol can be fixed in the time slot. At this time, the target reference symbol can be indicated by the indication information in the scheduling instruction. For details, the description in the embodiment shown in FIGS. 4 and 6 is referred to; or, the target reference symbol may change in the time slot following the change of the second time domain resource. At this time, the target reference symbol may be indicated by the second time domain resource, which are described in the embodiments shown in FIGS. 7 and 10.

2. Offset Information

The offset information is determined according to scheduling rules, and the method for determining the offset information is not limited in this embodiment.

The starting position of the first time domain resource can be determined according to the target reference symbol and the offset information. For example, if the target reference symbol is the second symbol, and the offset information is 2 symbols, the starting position of the first time domain resource is the fifth symbol.

3. Symbol Length

The symbol length is determined according to the data amount of data to be transmitted, and the method of determining the symbol length is not limited in this embodiment.

The end position of the first time domain resource is determined according to the starting position and the symbol length of the first time domain resource. For example, if the starting position of the first time domain resource is the fifth symbol and the symbol length is 6 symbols, the end position of the first time domain resource is the tenth symbol.

It can be seen that the starting position and the end position of the first time domain resource can be determined according to the target reference symbol, the offset information, and the symbol length, and the first time domain resource can be uniquely determined. The access network device can indicate the first time domain resource to the terminal through the target reference symbol, the offset information, and the symbol length. The following four embodiments introduce four ways of indicating the first time domain resource.

FIG. 4 is a flowchart of a resource indication method on the unlicensed spectrum according to another exemplary embodiment. The resource indication method on the unlicensed spectrum is applied in the implementation environment shown in FIG. 2. As shown in FIG. 4, the resource indication method on the unlicensed spectrum includes the following.

In step 401, the access network device determines the target reference symbol based on the second time domain resource, and determines the index information corresponding to the target reference symbol according to the correspondence. The second time domain resource is the time domain resource used to send the scheduling instruction, and the correspondence is used to indicate the relationship between the index information and the target reference symbol.

Before determining the target reference symbol, the access network device needs to pre-configure at least one target reference symbol, and then select the target reference symbol from the at least one target reference symbol based on the second time domain resource. The configuration process of the at least one target reference symbol is introduced below.

In this embodiment, the target reference symbol is fixed in the time slot, and the at least one fixed symbol can be configured as the target reference symbol from the 14 symbols in a time slot in advance. The number and locations of configured symbols are not limited in this embodiment. Two configuration methods of the target reference symbol are introduced below.

In the first configuration mode, at least one target reference symbol can be selected from 14 symbols according to a predetermined algorithm, the predetermined algorithm is not limited in this embodiment. For example, if each symbol is selected as a target reference symbol, 14 target reference symbols are obtained; or, starting from the first symbol, every other symbol is selected as a target reference symbol, and then 7 target reference symbols are obtained.

In the second configuration, the target reference symbol can be selected from at least one fixed position in the 14 symbols. For example, if the third symbol and the eighth symbol are selected as the target reference symbols, 2 target reference symbols are obtained.

After configuring the at least one target reference symbol, the access network device may select one target reference symbol from the at least one target reference symbol based on the second time domain resource. The target reference symbol selected by the access network device may be the symbol located before the second time domain resource or the symbol of the second time domain resource. In this case, the offset information needs to be greater than 1 to ensure that the starting position of the first time domain resource is after the second time domain resource; or, the target reference symbol selected by the access network device may be a symbol located after the second time domain resource.

It should be noted that when the scheduling instruction is sent on at least two symbols, the second time domain resource is determined by the starting position and end position of the second time domain resource. At this time, the target reference symbol can be selected based on the starting position or the end position according to the scheduling instruction. When the scheduling instruction is sent on a symbol, the second time domain resource position is both the starting position of the second time domain resource and the end position of the second time domain resource. At this time, the target reference symbol can be selected according to any of the positions.

After selecting the target reference symbol, the access network device can use the location information of the target reference symbol to indicate the target reference symbol. However, due to the large amount of data of the position information, in some embodiment, the position information of the target reference symbol can be encoded to obtain the encoded position information. Then the encoded position information can be used as the index information of the target reference symbol to create a correspondence indicating the relationship between the index information and the target reference symbol.

Assuming that every other symbol selects a target reference symbol, then the 0th second, fourth, sixth, eighth, tenth, and twelfth symbols are selected as the target reference symbols. If the position information of these 7 target reference symbols is encoded with a 3-bit binary value, the correspondences shown in Table 2 below can be obtained.

TABLE 2

| Index Information | Target Reference Symbol |
| --- | --- |
| 000 | $0^{th}$ symbol |
| 001 | second symbol |
| 010 | fourth symbol |
| 011 | sixth symbol |
| 100 | eighth symbol |
| 101 | tenth symbol |
| 110 | twelfth symbol |

Generally, the data amount of the index information is smaller than the data amount of the position information of the target reference signal, so transmission resources can be saved by setting the correspondence.

Assuming that the correspondence is shown in Table 2, the first time domain resource is the fifth symbol to the seventh symbol, and the second time domain resource is the first symbol, then the access network device may select the second symbol located after the second time domain resource as the target reference symbol, and the obtained index information is 001.

It should be noted that the correspondence between the access network device and the terminal may be pre-configured. At this time, the access network device configures the correspondence to the terminal; or, the correspondence may also be predefined by the communication protocol. In this case, the access network device does not need to configure the correspondence to the terminal.

When the access network device configures the correspondence for the terminal, the access network device may send the correspondence carried in a RRC signaling to the terminal; or, the access network device can also send the correspondence carried in other signaling to the terminal, which is not limited in this embodiment.

In step 402, the access network device generates the scheduling instruction, and the scheduling instruction includes the index information, offset information, and symbol length.

When generating the scheduling instruction, the access network device may determine the starting position of the first time domain resource and the offset information generated by the target reference symbol. The symbol length is generated according to the starting position and the end position.

Assuming the correspondences are shown in Table 2, the first time domain resource is the fifth symbol to the seventh symbol, and the second symbol is used as the target reference symbol. The access network device can determine that the symbol needs to be shifted by 2 symbols, and the symbol length is 3 symbols, the index information in the scheduling instruction is 001, the offset information is 2, and the symbol length is 3.

In step 403, the access network device sends the scheduling instruction to the terminal.

In a possible application scenario, the access network device may perform LBT on the unlicensed spectrum, and send the scheduling instruction to the terminal when the LBT is successful.

In step 404, the terminal receives the scheduling instruction sent by the access network device.

In step 405, the terminal obtains the index information in the scheduling instruction, and determines the target reference symbol corresponding to the index information according to the correspondence.

The correspondence may be pre-configured by the access network device to the terminal. At this time, the terminal receives the correspondence configured by the access network device; or, the correspondence may also be predefined by the communication protocol. At this time, the terminal reads the pre-stored correspondence.

When the access network device sends the correspondence carried in the RRC signaling to the terminal, the terminal receives the RRC signaling, reads the correspondence from the RRC signaling, and then stores the correspondence.

Assuming that the index information in the scheduling instruction is 001, the terminal can determine from the correspondence that the target reference symbol is the second symbol.

In step 406, the terminal obtains the offset information and the symbol length in the scheduling instruction.

It should be noted that this embodiment does not limit the execution order of obtaining the index information, the offset information and the symbol length.

In step 407, the terminal determines the starting position of the first time domain resource according to the target reference symbol and the offset information, and determines the number of symbols contained in the first time domain resource according to the symbol length information, and the first time domain resource is the time domain resource used for data transmission.

Figure 5:
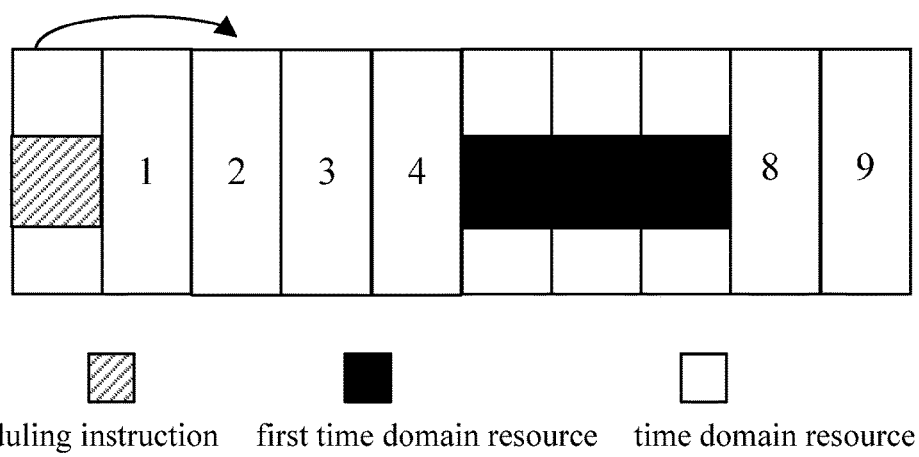
FIG. 5 is a schematic diagram of resource allocation of unlicensed spectrum according to an embodiment of the present disclosure.

Assuming that the index information in the scheduling instruction is 001, the offset information is 2, and the symbol length is 3, the terminal determines from the correspondence relationship that the target reference symbol is the second symbol, and the first time domain resource is the fifth to seventh symbol. FIG. 5 is a schematic diagram of resource allocation of unlicensed spectrum, in which the shaded area is the scheduling instruction, the white filled area is the time-frequency resource, the black filled area is the first time domain resource, and the arrow of the scheduling instruction points to the target reference symbol.

It should be noted that the embodiment takes the setting of the correspondence for the reference target symbol as an example, in the implementation, the correspondence may also be at least one correspondence of the offset information and the symbol length, which is not limited in this embodiment. Certainly, since the number of target reference symbols is 14 at most, the value of the target reference symbol may be relatively fixed. Therefore, it is more appropriate to set the above correspondence for the target reference symbol, and the value range of the offset information and the value range of the symbol length are relatively large, so there is no need to set the correspondence between the offset information and the symbol length, and the offset information and the symbol length are directly indicated in the scheduling instruction.

Steps 401-403 are implemented respectively as embodiments on the access network device side, and steps 404-407 are implemented respectively as embodiments on the terminal side.

In conclusion, in the resource indication method on the unlicensed spectrum of the present disclosure, a scheduling instruction sent by an access network device is received, the first time domain resource is determined according to the scheduling instruction. Since the determined starting position of the first time domain resource is obtained based on the second time domain resource, the first time domain resource is the first time domain used for data transmission, the second time domain resource is the second time domain resource used to send the scheduling instruction. In this way, the starting position of the first time domain resource is set to always be after the second time domain resource and change with the change of the second time domain resource, which solves the problem that when data can only be transmitted on a fixed time domain resource, if the fixed time domain resource is not successfully occupied, the access network device and the terminal cannot transmit data on the fixed time domain resource, and the effect of the success rate of data transmission is improved.

Generally, when the data amount of the index information is smaller than the data amount of the symbol information of the target reference signal, transmission resources can be saved by setting the first configuration information.

FIG. 6 is a flowchart of a resource indication method on the unlicensed spectrum according to another exemplary embodiment. The resource indication method on the unlicensed spectrum is applied in the implementation environment shown in FIG. 2. As illustrated in FIG. 6, the resource indication method on the unlicensed spectrum includes the following.

In step 601, the access network device determines the target reference symbol based on the second time domain resource, and encodes the target reference symbol in a bitmap manner to obtain coding information, in which the second time domain resource is a time domain resource used to send the scheduling instruction.

The access network device is configured with at least one target reference symbol, and the process of selecting the target reference symbol from the at least one target reference symbol is described in step 401 for details, which will not be repeated here.

After obtaining the target reference symbol, the access network device encodes the target reference symbol in a bitmap manner to obtain the encoding information. The bitmap is introduced below.

Bitmap uses a bit to mark the value corresponding to a certain element. For example, if a time slot includes 14 symbols, and the target reference symbol is the second symbol, the value of the second bit in the 14-bit data can be set to 1, and the value of the remaining bits can be set to 0, that is 01000000000000.

Generally, bits are used to store data, to greatly save storage space. Therefore, the target reference symbol is encoded in a bitmap manner to save storage space.

In step 602, the access network device generates the scheduling instruction, and the scheduling instruction includes the encoding information, the offset information, and the symbol length.

The process of generating the offset information and the symbol length by the access network device is detailed in the description in step 402, which is not repeated here.

Assuming that the first time domain resource is the fifth symbol to the seventh symbol, the encoding information is 01000000000000, which needs to be shifted by 2 symbols, and the symbol length is 3 symbols, then the encoding information in the scheduling instruction is 01000000000000, the offset information is 2, and the symbol length is 3.

It should be noted that the access network device may also encode at least one of the offset information and the symbol length in a bitmap manner, which is not limited in this embodiment.

In step 603, the access network device sends the scheduling instruction to the terminal.

In step 604, the terminal receives the scheduling instruction sent by the access network device.

In step 605, the terminal obtains the coding information in the scheduling instruction, and decodes the coding information to obtain the target reference symbol.

Assuming that the encoding information in the scheduling instruction is 01000000000000, the terminal can determine that the target reference symbol is the second symbol.

In step 606, the terminal obtains the offset information and the symbol length in the scheduling instruction.

It should be noted that this embodiment does not limit the execution sequence of obtaining the encoding information, the offset information and the symbol length.

In step 607, the terminal determines the starting position of the first time domain resource according to the target reference symbol and the offset information, and determines the number of symbols contained in the first time domain resource according to the symbol length, and the first time domain resource is the time domain resource used for data transmission.

Assuming that the coding information in the scheduling instruction is 01000000000000, the offset information is 2, and the symbol length is 3, the terminal can determine that the target reference symbol is the second symbol, and the first time domain resource is the fifth symbol to the seventh symbol.

Steps 601-603 can be implemented respectively as embodiments on the access network device side, and steps 604-607 can be implemented respectively as embodiments on the terminal side.

In conclusion, in the resource indication method on the unlicensed spectrum provided by the disclosure, a scheduling instruction sent by an access network device is received, and the first time domain resource is determined according to the scheduling instruction. The starting position of the determined first time domain resource is obtained based on the second time domain resource. The first time domain resource is a time domain resource used for data transmission, and the second time domain resource is a time domain resource used to send the scheduling instruction. In this way, the starting position of the first time domain resource can be set to always be subsequent to the second time domain resource and change with the change of the second time domain resource, which solves the problem that when data can only be transmitted on a fixed time domain resource, if the fixed time domain resource is not successfully occupied, the access network device and terminal cannot transmit data on the fixed time domain resource, which achieves the effect of increasing the success rate of data transmission.

The target reference symbol is encoded in the bitmap manner to save storage space.

Figure 7:
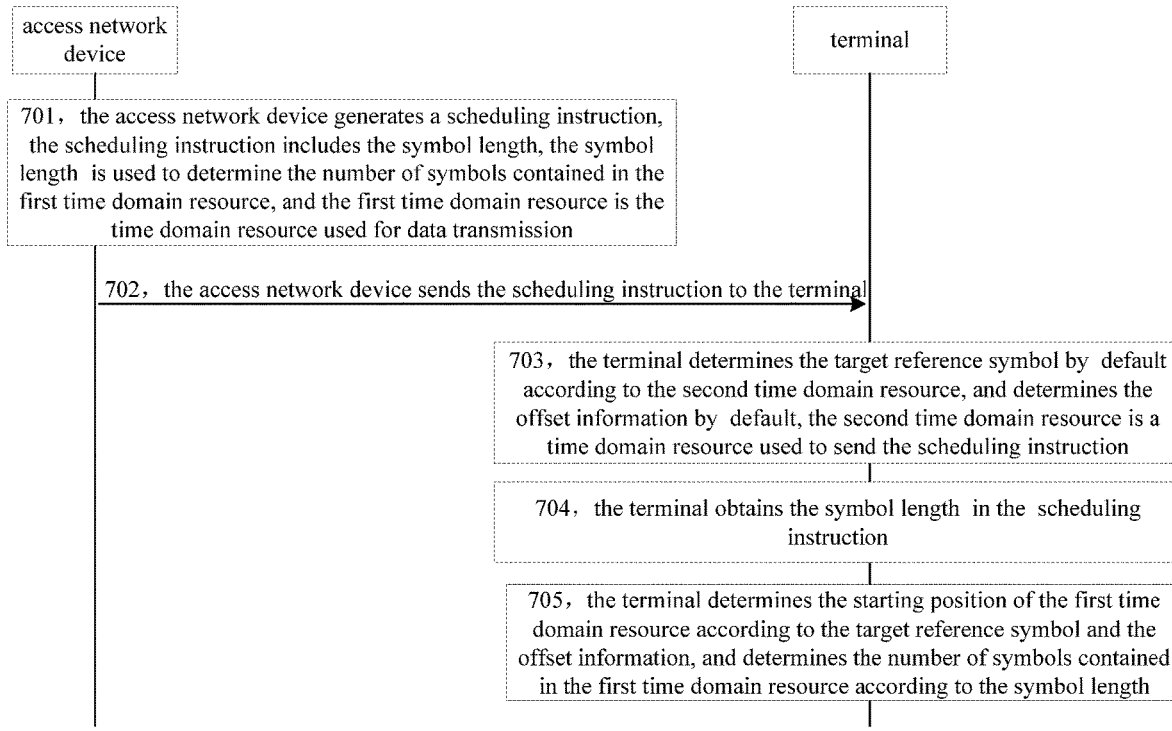
FIG. 7 is a flowchart of a resource indication method on an unlicensed spectrum according to an embodiment of the present disclosure.

FIG. 7 is a flowchart of a resource indication method on an unlicensed spectrum according to another exemplary embodiment. The resource indication method on the unlicensed spectrum is applied in the implementation environment shown in FIG. 2. As illustrated in FIG. 7, the resource indication method on the unlicensed spectrum includes the following.

In step 701, the access network device generates a scheduling instruction. The scheduling instruction includes the symbol length. The symbol length is used to determine the number of symbols contained in the first time domain resource. The first time domain resource is a time domain resource for data transmission.

In this embodiment, the target reference symbol is default, and the target reference symbol is determined based on the second time domain resource. That is, the target reference symbol changes in the time slot with the change of the second time domain resource. For example, the target reference symbol is the symbol of the second time domain resource, or the target reference symbol is a symbol obtained by shifting the second time domain resource backward by a predetermined number of symbols, which is not limited in this embodiment.

In this embodiment, the offset information is set by default. For example, the offset information is 0, or the offset information is 1 symbol, which is not limited in this embodiment.

In some embodiment, the target reference symbol and the offset information by default may be indicated to the terminal based on the first configuration information. The first configuration information may be pre-configured by the access network device to the terminal. At this time, the access network device configures the first configuration information on the terminal; or, the first configuration information may be predefined by the communication protocol. The network access device does not need to configure the first configuration information to the terminal.

When the access network device configures the first configuration information to the terminal, the access network device sends the first configuration information carried in the RRC signaling to the terminal; or, the access network device may also send the first configuration information carried in other signaling to the terminal, which is not limited in this embodiment.

Since the target reference symbol can be determined according to the second time domain resource, and the second time domain resource is known, the target reference symbol can be regarded as known. In addition, the offset information is also known, the starting position of the first time domain resource by default can be determined according to the target reference symbol and the offset information. The access network device only needs to indicate the symbol length to the terminal, and the terminal can uniquely determine the first time domain resource.

Assuming that the first time domain resource is the first symbol to the third symbol, the second time domain resource is the $0^{th}$ symbol, and the first configuration information indicates that the target reference symbol is a symbol after the second time domain resource, and the offset information is 0, and the symbol length is 3.

In step 702, the access network device sends the scheduling instruction to the terminal.

In step 703, the terminal determines the default target reference symbol according to the second time domain resource, and determines the default offset information, and the second time domain resource is a time domain resource used to send the scheduling instruction.

The terminal may first obtain the first configuration information, and determine the target reference symbol and the offset information according to the second time domain resource and the first configuration information.

The first configuration information may be pre-configured by the access network device to the terminal. At this time, the terminal receives the first configuration information configured by the access network device; or, the first configuration information may also be predefined by the communication protocol. In this case, the terminal reads the pre-stored first configuration information.

When the access network device carries the first configuration information in the RRC signaling and sends the RRC signaling to the terminal, the terminal receives the RRC signaling, reads the first configuration information from the RRC signaling, and then stores the first configuration information. In this way, in the subsequent resource indication, the access network device only needs to send the scheduling instruction carrying the symbol length to the terminal each time, instead of sending the first configuration information again, which can save transmission resources.

In step 704, the terminal obtains the symbol length in the scheduling instruction.

In step 705, the terminal determines the starting position of the first time domain resource according to the target reference symbol and the offset information, and determines the number of symbols contained in the first time domain resource according to the symbol length.

Figure 8:
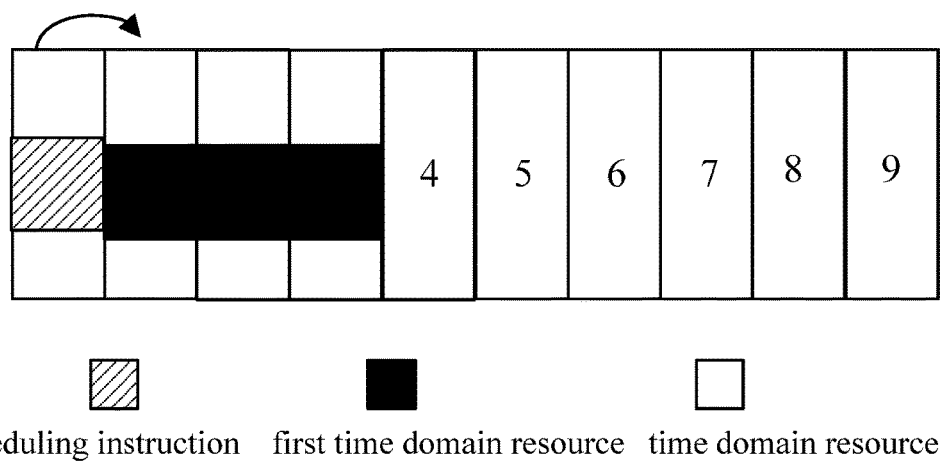
FIG. 8 is a schematic diagram of resource allocation of unlicensed spectrum according to an embodiment of the present disclosure.

Assuming that the second time domain resource is the $0^{th}$ symbol, and the first configuration information indicates that the target reference symbol is one symbol after the second time domain resource, the offset information is 0, and the symbol length is 3, the terminal determines the first time domain resource is the first symbol to the third symbol. FIG. 8 illustrates a schematic diagram of resource allocation of unlicensed spectrum, in which the shaded area is the scheduling instruction, the white filled area is the time-frequency resource, the black filled area is the first time domain resource, and the arrow of the scheduling instruction points to the target reference symbol.

Since the default starting position of the first time domain resource is fixed, and each resource scheduling changes in real time, conflicts between the starting position by default and resource scheduling may be caused, for example, the time domain resource of the starting position by default is occupied. Therefore, it is also necessary to adjust the starting position by default according to the resource scheduling in real time.

In a possible implementation, if in the time slot to which the second time domain resource belongs, the time domain resource at the position determined according to the position information and the offset information of the target reference symbol is occupied, the terminal determines a position in the next time slot corresponding to the determined position as the starting position of the first time domain resource.

Figure 9:
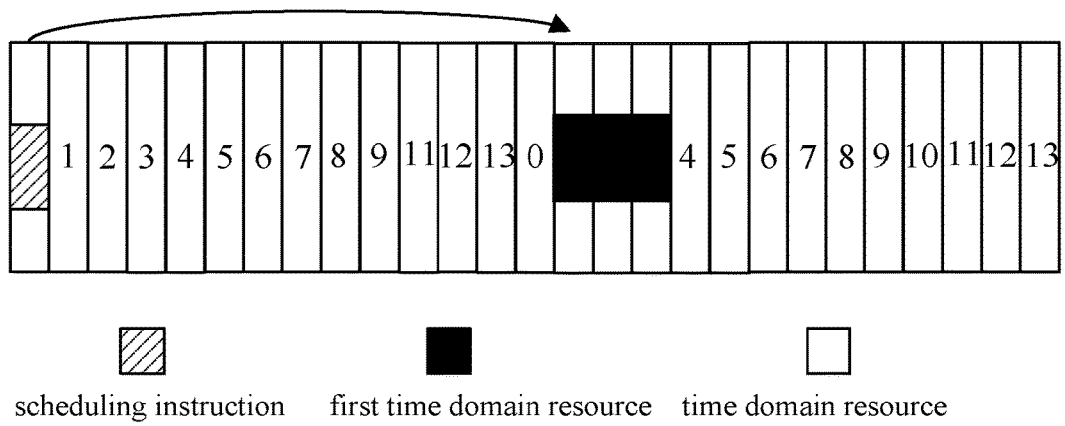
FIG. 9 is a schematic diagram of resource allocation of unlicensed spectrum according to an embodiment of the present disclosure.

FIG. 9 is a schematic diagram of cross-slot scheduling. As illustrated in FIG. 7, the starting position of the first time domain resource by default is the first symbol in the previous time slot. If the first symbol is occupied, then the starting position of the first time domain resource by default is set as the first symbol in the next time slot.

Steps 701-702 are implemented separately as an embodiment on the access network device side, and steps 703-705 can be implemented separately as an embodiment on the terminal side.

In conclusion, in the resource indication method on the unlicensed spectrum provided by the disclosure, a scheduling instruction sent by an access network device is received, and the first time domain resource is determined according to the scheduling instruction. The starting position is obtained based on the second time domain resource. The first time domain resource is a time domain resource used for data transmission, and the second time domain resource is a time domain resource used to send the scheduling instruction. In this way, the starting position of the first time domain resource can be set to always be subsequent to the second time domain resource and change with the change of the second time domain resource, which solves the problem that when data can only be transmitted on a fixed time domain resource, if the fixed time domain resource is not successfully occupied, the access network device and terminal cannot transmit data on the fixed time domain resource, which achieves the effect of increasing the success rate of data transmission.

Since the position information and the offset information of the target reference symbol are determined by default, the access network device only needs to send the symbol length to the terminal, which can save transmission resources.

Figure 10:
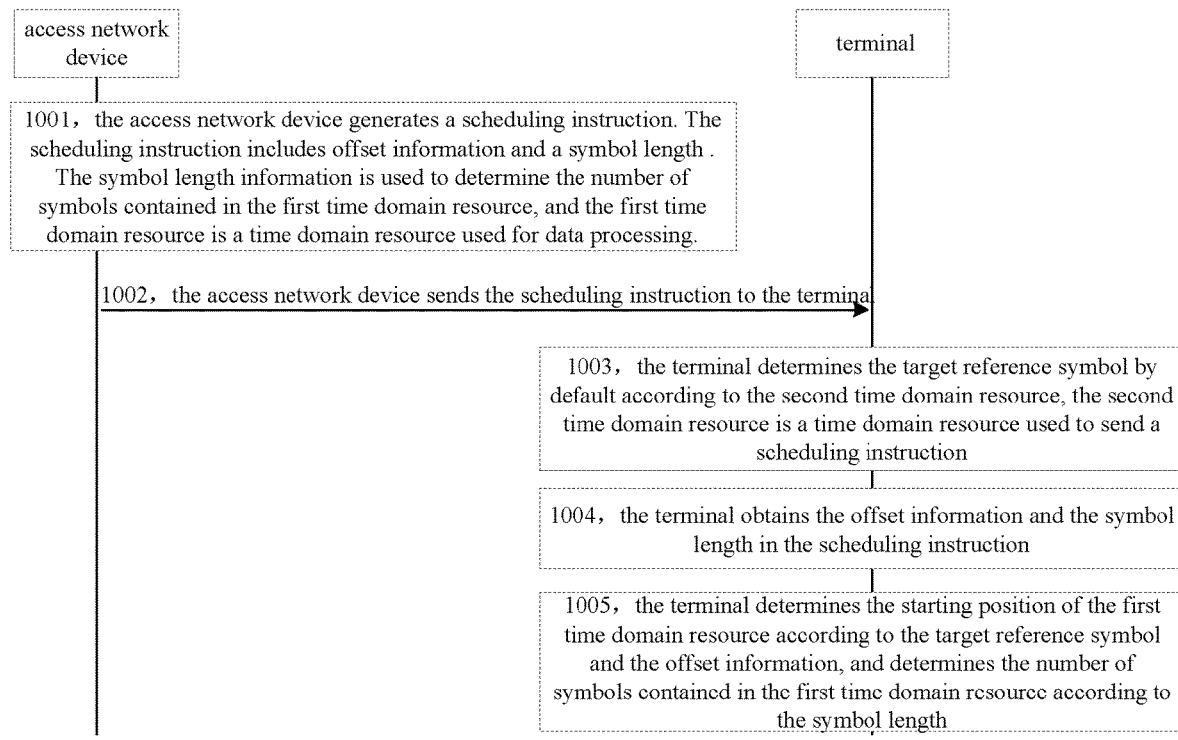
FIG. 10 is a flowchart of a resource indication method on an unlicensed spectrum according to an embodiment of the present disclosure.

FIG. 10 is a flowchart of a resource indication method on an unlicensed spectrum according to another exemplary embodiment. The method is applied in the implementation environment shown in FIG. 2. As illustrated in FIG. 10, the resource indication method on the unlicensed spectrum includes the following.

In step 1001, the access network device generates the scheduling instruction. The scheduling instruction includes the offset information and the symbol length. The symbol length is used to determine the number of symbols contained in the first time domain resource. The first time domain resource is the time domain resource used for data transmission.

In this embodiment, the target reference symbol is set by default, and the target reference symbol is determined based on the second time domain resource. That is, the target reference symbol changes in the time slot with the change of the second time domain resource. For example, the target reference symbol is the symbol of the second time domain resource, or the target reference symbol is a symbol obtained by shifting the second time domain resource backward by a predetermined number of symbols, which is not limited in this embodiment.

In some embodiment, the default target reference symbol may be indicated to the terminal through the second configuration information. The second configuration information may be pre-configured by the access network device to the terminal. At this time, the access network device configures the second configuration information on the terminal;

or, the second configuration information may also be predefined by the communication protocol. The network access device does not need to configure the second configuration information to the terminal.

When the access network device configures the second configuration information to the terminal, the access network device may send the second configuration information carried in the RRC signaling to the terminal; or, the access network device may also send the second configuration information carried in other signaling to the terminal, which is not limited in this embodiment.

Since the target reference symbol can be determined according to the second time domain resource, and the second time domain resource is known, the target reference symbol can be regarded as known, and the access network device only needs to indicate the offset information and the symbol length to the terminal, the terminal can uniquely determine the first time domain resource.

Assuming that the first time domain resource is the second to fourth symbol, the second time domain resource is the $0^{th}$ symbol, and the second configuration information indicates that the position of the target reference symbol is the second time domain resource position, the offset information is 2, and the symbol length is 3.

In step 1002, the access network device sends the scheduling instruction to the terminal.

In step 1003, the terminal determines the target reference symbol by default according to the second time domain resource, and the second time domain resource is a time domain resource used to send the scheduling instruction.

The terminal may first obtain the second configuration information, and determine the location information of the target reference symbol according to the second time domain resource location and the second configuration information.

The second configuration information may be pre-configured by the access network device to the terminal. At this time, the terminal receives the second configuration information configured by the access network device; or, the second configuration information may also be predefined by the communication protocol. In this case, the terminal reads the pre-stored second configuration information.

When the access network device carries the second configuration information in the RRC signaling and sends the RRC signaling to the terminal, the terminal receives the RRC signaling, reads the second configuration information from the RRC signaling, and then stores the second configuration information. In this way, during subsequent resource indications, the access network device only needs to send the scheduling instruction carrying the symbol length to the terminal each time, without the need to send the second configuration information again, which can save the transmission resources.

In step 1004, the terminal obtains the offset information and the symbol length in the scheduling instruction.

In step 1005, the terminal determines the starting position of the first time domain resource according to the target reference symbol and the offset information, and determines the number of symbols contained in the first time domain resource based on the symbol length.

Figure 11:
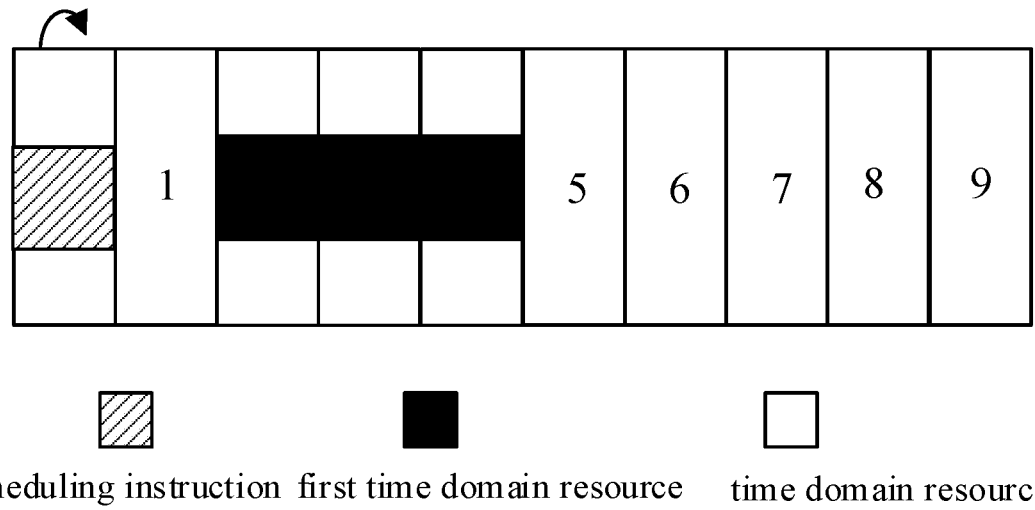
FIG. 11 is a schematic diagram of resource allocation of unlicensed spectrum according to an embodiment of the present disclosure.

Assuming that the second time domain resource is the $0^{th}$ symbol, and the second configuration information indicates that the target reference symbol is the symbol of the second time domain resource, the offset information is 2, and the symbol length is 3. The terminal determines that the first time domain resource is the second symbol to the fourth symbol. FIG. 11 is a schematic diagram of resource allocation of unlicensed spectrum, in which the shaded area is the scheduling instruction, the white filled area is the time-frequency resource, the black filled area is the first time domain resource, and the arrow of the scheduling instruction points to the target reference symbol.

Steps 1001-1002 can be separately implemented as an embodiment on the access network device side, and steps 1003-1005 can be separately implemented as an embodiment on the terminal side.

In conclusion, in the resource indication method on the unlicensed spectrum provided by the disclosure, by receiving the scheduling instruction sent by the access network device, the first time domain resource is determined according to the scheduling instruction. Since the determined starting position of the first time domain resource is obtained based on the second time domain resource, the first time domain resource is the first time domain resource used for data transmission, and the second time domain resource is the second time domain resource used to send the scheduling instruction. In this way, the starting position of the first time domain resource can be set to always be after the second time domain resource and changes with the change of the second time domain resource, which solves the problem that when data can only be transmitted on a fixed time domain resource, if the fixed time domain resource is not successfully occupied, the access network device and the terminal cannot transmit data on the fixed time domain resources, to achieve the effect of improving the success rate of data transmission.

Since the position information of the target reference symbol is set by default, the access network device only needs to send the offset information and the symbol length to the terminal, which can save the transmission resources.

Figure 12:
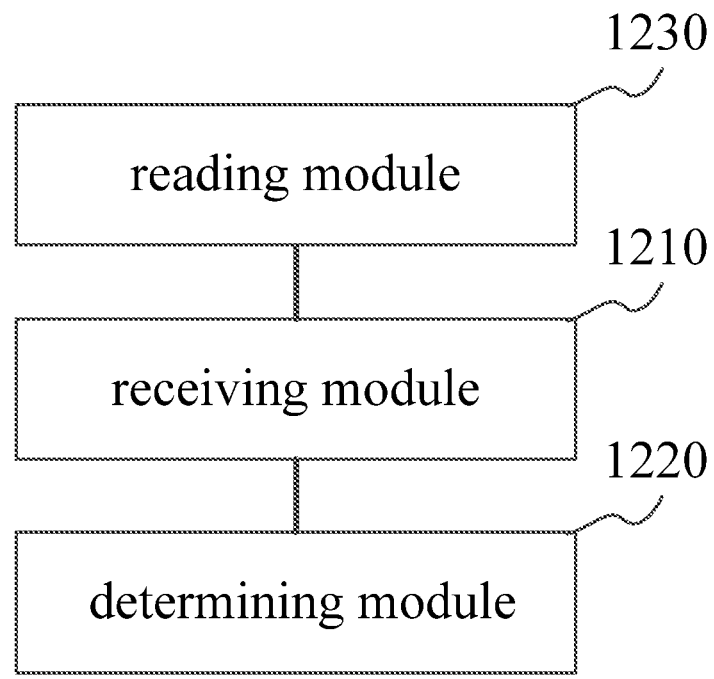
FIG. 12 is a block diagram of a resource indication apparatus on an unlicensed spectrum according to an embodiment of the present disclosure.

FIG. 12 is a block diagram of a resource indication apparatus on an unlicensed spectrum according to an exemplary embodiment. The resource indication apparatus on the unlicensed spectrum is applied to the terminal 201 shown in FIG. 2. As illustrated in FIG. 12, the resource indication apparatus on the unlicensed spectrum includes: a receiving module 1210 and a determining module 1220.

The receiving module 1210 is configured to receive a scheduling instruction sent by an access network device.

The determining module 1220 is configured to determine a first time domain resource according to the scheduling instruction, in which the first time domain resource is a time domain resource configured to transmit data, a start position of the first time domain resource is obtained based on a second time domain resource, and the second time domain resource is a time domain resource configured to send the scheduling instruction.

In a possible implementation, the determining module 1220 is further configured to: determine a target reference symbol according to the second time domain resource or indication information in the scheduling instruction, in which the target reference symbol indicated by the indication information is determined by the access network device based on the second time domain resource, and the target reference symbol is configured to determine the start position of the first time domain resource; and determine the first time domain resource according to the target reference symbol and the scheduling instruction.

In a possible implementation, the indication information contains index information, and the determining module 1220 is further configured to: obtain the index information in the scheduling instruction, and determine the target reference symbol corresponding to the index information according to a correspondence indicating a relationship between the index information and the target reference symbol.

In a possible implementation, the receiving module 1220 is configured to receive the correspondence configured by the access network device; or, the apparatus further includes a reading module 1230 configured to read the correspondence pre-stored by the terminal.

In a possible implementation, the indication information contains coding information, the coding information is obtained by coding the target reference symbol into bitmap, and the determining module 1220 is further configured to: obtain the coding information in the scheduling instruction, and obtain the target reference symbol by decoding the coding information.

In a possible implementation, the determining module 1220 is further configured to: determine the target reference symbol by default according to the second time domain resource.

In a possible implementation, the determining module 1220 is further configured to: determine an offset information by default; obtain a symbol length in the scheduling instruction; and determine the start position of the first time domain resource according to the target reference symbol and the offset information, and determine the number of symbols in the first time domain resource according to the symbol length.

In a possible implementation, the determining module 1220 is further configured to: obtain the offset information and the symbol length in the scheduling instruction; and determine the start position of the first time domain resource according to the target reference symbol and the offset information, and determine the number of symbols in the first time domain resource according to the symbol length.

In conclusion, in the resource indication method on the unlicensed spectrum provided by the disclosure, by receiving the scheduling instruction sent by the access network device, the first time domain resource is determined according to the scheduling instruction. Since the determined starting position of the first time domain resource is obtained based on the second time domain resource, the first time domain resource is the first time domain resource used for data transmission, and the second time domain resource is the second time domain resource used to send the scheduling instruction. In this way, the starting position of the first time domain resource can be set to always be subsequent to the second time domain resource and changes with the change of the second time domain resource, which solves the problem that when data can only be transmitted on a fixed time domain resource, if the fixed time domain resource is not successfully occupied, the access network device and the terminal cannot transmit data on the fixed time domain resources, to achieve the effect of improving the success rate of data transmission.

Figure 13:
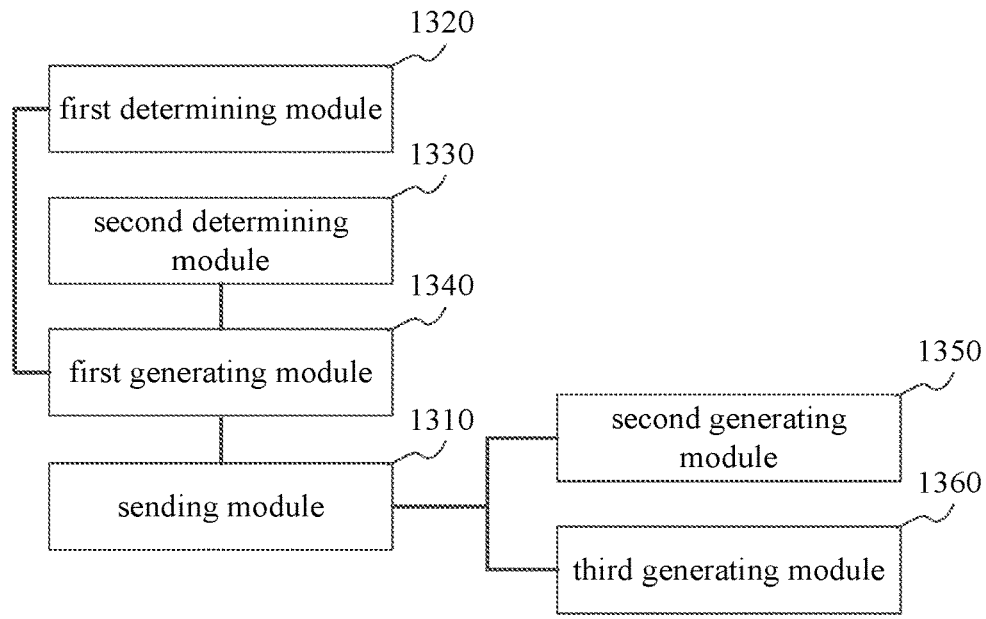
FIG. 13 is a block diagram of a resource indication apparatus on an unlicensed spectrum according to an embodiment of the present disclosure.

FIG. 13 is a block diagram of a resource indication apparatus on an unlicensed spectrum according to an exemplary embodiment. The apparatus is applied to the access network device 202 shown in FIG. 2. As illustrated in FIG. 13, the apparatus includes: a sending module 1310.

The sending module 1310 is configured to send a scheduling instruction by an access network device to a terminal. The scheduling instruction is configured to inform the terminal of a first time domain resource, the first time domain resource is a time domain resource configured to transmit data, and a start position of the first time domain resource is obtained based on a second time domain resource, and the second time domain resource is a time domain resource configured to transmit the scheduling instruction.

In a possible implementation, the first time domain resource is determined according to the scheduling instruction and the target reference symbol, and the target reference symbol is configured to determine the start position of the first time domain resource, and the target reference symbol is indicated to the terminal through the second time domain resource, or the target reference symbol is indicated to the terminal through the indication information in the scheduling instruction after the target reference symbol is determined based on the second time domain resource.

In a possible implementation, the apparatus further includes: a first determining module 1320, which is configured to determine index information corresponding to the target reference symbol according to a correspondence as the indication information, in which the correspondence is configured to indicate the relationship between the index information and the target reference symbol.

In a possible implementation, the sending module 1310 is further configured to: configure the correspondence for the terminal.

In a possible implementation, the apparatus further includes: a second determining module 1330, configured to obtain coding information by coding the target reference symbol into bitmap, and determine the coding information as the indication information.

In a possible implementation, the apparatus further includes: a first generating module 1340, configured to generate the scheduling instruction, the scheduling instruction contains the indication information, offset information, and symbol length.

The indication information is configured to indicate the target reference symbol, the start position of the first time domain resource is determined based on the target reference symbol and the offset information, and a number of symbols in the first time domain resource is determined based on the symbol length.

In a possible implementation, the apparatus further includes: a second generating module 1350, configured to generate the scheduling instruction containing the symbol length.

The number of symbols in the first time domain resource is determined based on the symbol length, the start position of the first time domain resource is determined according to the target reference symbol and the offset information, and the target reference symbol and the offset information are determined by the terminal by default according to the second time domain resource.

In a possible implementation, the apparatus further includes: a third generating module 1360, configured to generate the scheduling instruction containing the offset information and the symbol length.

The number of symbols in the first time domain resource is determined based on the symbol length, and the start position of the first time domain resource is determined according to the target reference symbol and the offset information, and the target reference symbol is determined by the terminal by default according to the second time domain resource.

In conclusion, with the resource indication apparatus on the unlicensed spectrum provided by the disclosure, a scheduling instruction sent by an access network device is received, and the first time domain resource is determined according to the scheduling instruction. The starting position is obtained based on the second time domain resource. The first time domain resource is a time domain resource used for data transmission, and the second time domain resource is a time domain resource used to send the scheduling instruction. In this way, the starting position of the first time domain resource can be set to always be subsequent to the second time domain resource and change with the change of the second time domain resource, which solves the problem that when data can only be transmitted on a fixed time domain resource, if the fixed time domain resource is not successfully occupied, the access network device and terminal cannot transmit data on the fixed time domain resource, which achieves the effect of increasing the success rate of data transmission.

An exemplary embodiment of the disclosure provides a terminal capable of implementing the resource indication method on the unlicensed spectrum provided in the disclosure. The terminal includes: a processor and a memory for storing the processor executable signaling. The processor is configured to: receive a scheduling instruction sent by an access network device; and determine a first time domain resource according to the scheduling instruction, in which the first time domain resource is a time domain resource configured to transmit data, a start position of the first time domain resource is obtained based on a second time domain resource, and the second time domain resource is a time domain resource configured to send the scheduling instruction.

An exemplary embodiment of the disclosure provides an access network device that can implement the resource indication method on the unlicensed spectrum provided by the disclosure. The access network device includes a processor and a memory configured to store the processor executable signaling. The processor is configured to: send a scheduling instruction to a terminal, in which the scheduling instruction is configured to inform the terminal of a first time domain resource, the first time domain resource is a time domain resource configured to transmit data, and a start position of the first time domain resource is obtained based on a second time domain resource, and the second time domain resource is a time domain resource configured to transmit the scheduling instruction.

Figure 14:
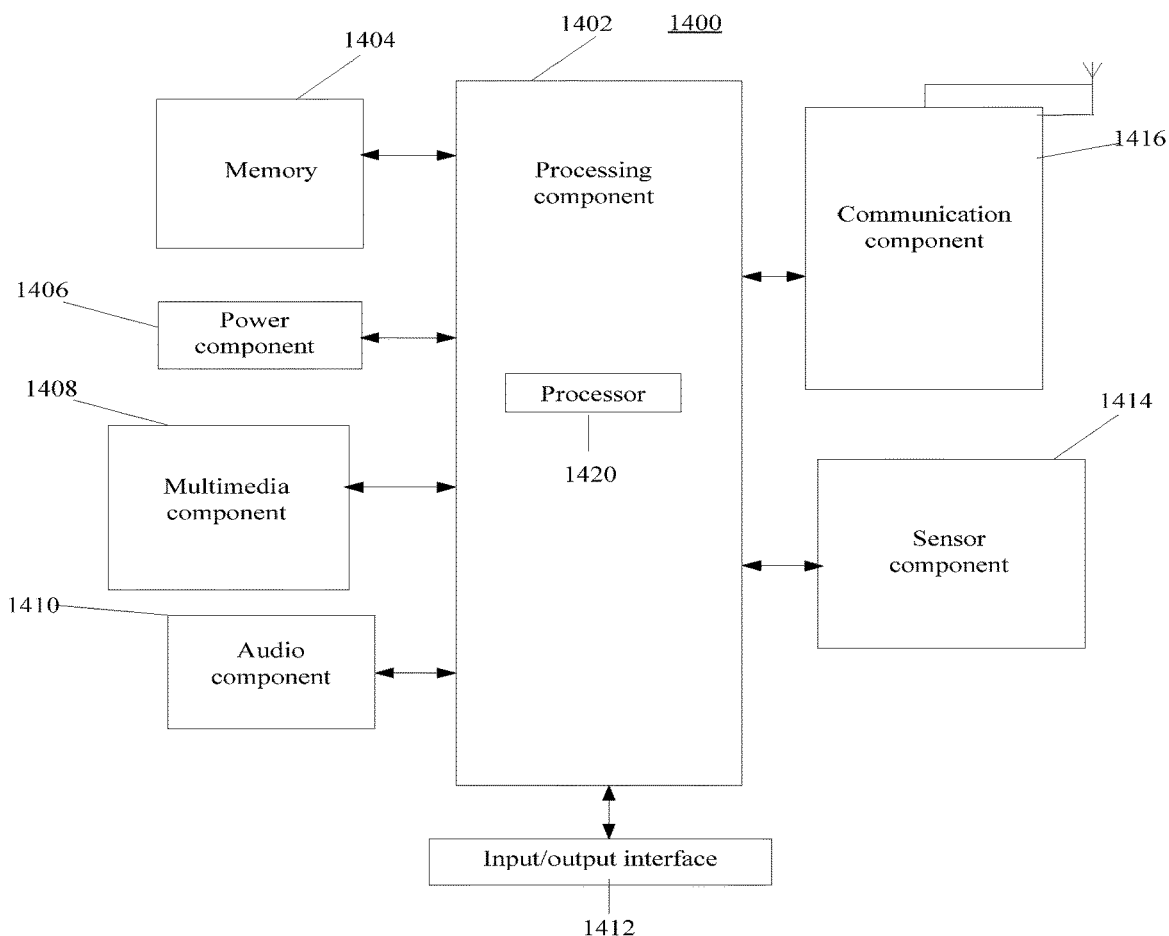
FIG. 14 is a block diagram of an apparatus for indicating resources on an unlicensed spectrum according to an embodiment of the present disclosure.

FIG. 14 is a block diagram illustrating a resource indication apparatus 1400 on an unlicensed spectrum according to an embodiment of the disclosure. For example, the user equipment 1400 may be a mobile phone, a computer, a digital broadcasting terminal, a message transceiver device, a game console, a tablet device, a medical device, a fitness device and a personal digital assistant.

As illustrated in FIG. 14, the apparatus 1400 may include one or more of the following components: a processing component 1402, a memory 1404, a power component 1406, a multimedia component 1408, an audio component 1410, an input/output (I/O) interface 1412, a sensor component 1414, and a communication component 1416.

The processing component 1402 typically controls overall operations of the apparatus 1400, such as the operations associated with display, telephone calls, data communications, camera operations, and recording operations. The processing component 1402 may include one or more processors 1420 to execute instructions to perform all or part of the steps in the above described method. Moreover, the processing component 1402 may include one or more modules which facilitate the interaction between the processing component 1402 and other components. For instance, the processing component 1402 may include a multimedia module to facilitate the interaction between the multimedia component 1408 and the processing component 1402.

The memory 1404 is configured to store various types of data to support the operation of the apparatus 1400. Examples of such data include instructions for any applications or methods operated on the apparatus 1400, contact data, phonebook data, messages, pictures, video, etc. The memory 1404 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1406 provides power to various components of the apparatus 1400. The power component 1406 may include a power management system, one or more power sources, and any other components associated with the generation, management, and distribution of power in the apparatus 1400.

The multimedia component 1408 includes a screen providing an output interface between the apparatus 1400 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 3708 includes a front-facing camera and/or a rear-facing camera. When the apparatus 1400 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 1410 is configured to output and/or input audio signals. For example, the audio component 1410 includes a microphone (MIC) configured to receive an external audio signal when the apparatus 1400 is in an operation mode, such as a call mode, a recording mode, and a voice recognition mode. The received audio signal may be further stored in the memory 1404 or transmitted via the communication component 1416. In some embodiments, the audio component 1410 further includes a speaker to output audio signals.

The I/O interface 1412 provides an interface between the processing component 1402 and peripheral interface modules, such as a keyboard, a click wheel, buttons, and the like. The buttons may include, but are not limited to, a home button, a volume button, a starting button, and a locking button.

The sensor component 1414 includes one or more sensors to provide status assessments of various aspects of the apparatus 1400. For instance, the sensor component 1414 may detect an open/closed status of the apparatus 1400, relative positioning of components, e.g., the display and the keypad, of the apparatus 1400, a change in position of the apparatus 1400 or a component of the apparatus 1400, a presence or absence of user contact with the apparatus 1400, an orientation or an acceleration/deceleration of the apparatus 1400, and a change in temperature of the apparatus 1400. The sensor component 1414 may include a proximity sensor configured to detect the presence of nearby objects without any physical contact. The sensor component 1414 may also include a light sensor, such as a CMOS or CCD image sensor, for use in imaging applications. In some embodiments, the sensor component 1414 may also include an accelerometer sensor, a gyroscope sensor, a magnetic sensor, a pressure sensor, or a temperature sensor.

The communication component 1416 is configured to facilitate communication, wired or wirelessly, between the apparatus 1400 and other devices. The apparatus 1400 can access a wireless network based on a communication standard, such as WiFi, 2G, or 3G, or a combination thereof. In an exemplary embodiment, the communication component 1416 receives a broadcast signal or broadcast associated information from an external broadcast management system via a broadcast channel. In an exemplary embodiment, the communication component 1416 further includes a near field communication (NFC) module to facilitate short-range communications.

In exemplary embodiments, the apparatus 1400 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described method.

In exemplary embodiments, there is also provided a non-transitory computer readable storage medium including instructions, such as included in the memory 1404, executable by the processor 1420 in the apparatus 1400, for performing the above method. For example, the non-transitory computer-readable storage medium may be a ROM, a RAM, a CD-ROM, a magnetic tape, a floppy disc, an optical data storage device, and the like.

A non-transitory computer-readable storage medium is provided in the embodiments. When the instructions in the storage medium are executed by the processor of the mobile terminal, the mobile terminal can execute the above resource indication method on the unlicensed spectrum.

Figure 15:
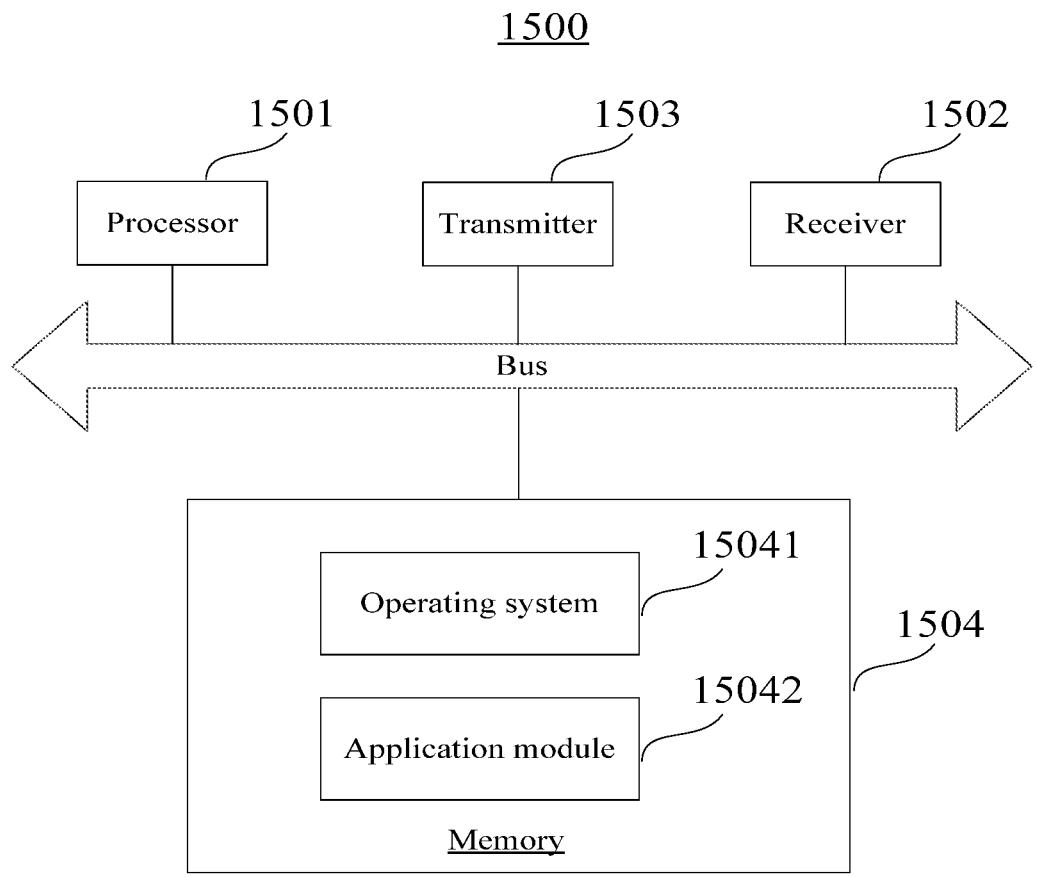
FIG. 15 is a block diagram of a resource indication apparatus on an unlicensed spectrum according to an embodiment of the present disclosure.

FIG. 15 is a block diagram of a resource indication apparatus 1500 on an unlicensed spectrum according to an exemplary embodiment. For example, the resource indication apparatus 1500 on the unlicensed spectrum may be an access network device. As illustrated in FIG. 15, the resource indication apparatus 1500 on the unlicensed spectrum may include: a processor 1501, a receiver 1502, a transmitter 1503 and a memory 1504. The receiver 1502, the transmitter 1503, and the memory 1504 are respectively connected to the processor 1501 through a bus.

The processor 1501 includes one or more processing cores, and the processor 1501 executes the method executed by the access network device in the resource indication method on unlicensed spectrum provided by the embodiments of the disclosure by running software programs and modules. The memory 1504 is configured to store software programs and modules. In detail, the memory 1504 may store an operating system 15041 and an application program module 15042 required by at least one function. The receiver 1502 is configured to receive communication data sent by other devices, and the transmitter 1503 is configured to send communication data to other devices.

Figure 16:
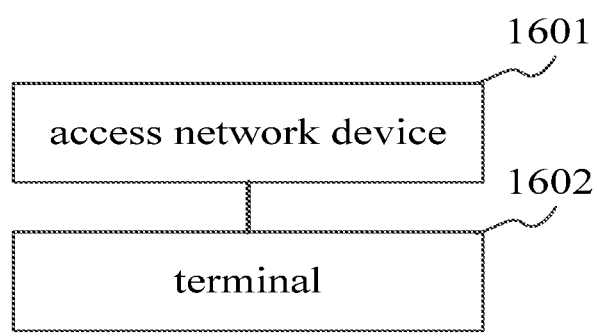
FIG. 16 is a block diagram of a resource indication system on an unlicensed spectrum according to an embodiment of the present disclosure.

FIG. 16 is a block diagram of a resource indication system on an unlicensed spectrum according to an exemplary embodiment. As illustrated in FIG. 16, the system includes an access network device 1601 and a terminal 1602.

The access network device 1601 is configured to execute the resource indication method on the unlicensed spectrum performed by the access network device in the embodiments shown in FIGS. 3 to 11.

The terminal 1602 is configured to execute the resource indication method on the unlicensed spectrum performed by the terminal in the embodiments shown in FIGS. 3 to 11.

An exemplary embodiment of the disclosure provides a computer-readable storage medium in which at least one instruction, at least one program, code set, or instruction set is stored, the at least one instruction, the at least one program, the code set or the instruction set is loaded and executed by the processor to implement the resource indication method on the unlicensed spectrum as described above.

Other embodiments of the disclosure will be apparent to those skilled in the art from consideration of the specification and practice of the disclosure disclosed here. This disclosure is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A resource indication method on an unlicensed spectrum, comprising:

receiving, by a terminal, a scheduling instruction sent by an access network device; and determining, by the terminal, a first time domain resource according to the scheduling instruction, wherein the first time domain resource is a time domain resource configured to transmit data, a start position of the first time domain resource is obtained based on a second time domain resource, and the second time domain resource is a time domain resource configured to send the scheduling instruction, wherein determining, by the terminal, the first time domain resource according to the scheduling instruction comprises:

determining, by the terminal, a target reference symbol according to the second time domain resource or indication information in the scheduling instruction, wherein the target reference symbol indicated by the indication information is determined by the access network device based on the second time domain resource, and the target reference symbol is configured to determine the start position of the first time domain resource; and determining, by the terminal, the first time domain resource according to the target reference symbol and the scheduling instruction, wherein the indication information comprises index information, and determining, by the terminal, the target reference symbol according to the indication information in the scheduling instruction comprises:

obtaining the index information in the scheduling instruction by the terminal, and determining the target reference symbol corresponding to the index information according to a correspondence indicating a relationship between the index information and the target reference symbol.

2. The method of claim 1, further comprising:
at least one of:
receiving, by the terminal, the correspondence configured by the access network device; and,
reading the correspondence pre-stored by the terminal.

3. The method of claim 1, wherein the indication information comprises coding information, the coding information is obtained by coding the target reference symbol into bitmap, and determining, by the terminal, the target reference symbol according to the indication information in the scheduling instruction, comprises:
obtaining the coding information in the scheduling instruction by the terminal, and obtaining the target reference symbol by decoding the coding information.

4. The method of claim 1, wherein the terminal determining the target reference symbol according to the second time domain resource comprises:
determining, by the terminal, the target reference symbol by default according to the second time domain resource.

5. The method of claim 4, further comprising:
determining an offset information by default by the terminal; and
determining, by the terminal, the first time domain resource according to the target reference symbol and the scheduling instruction, comprising:
obtaining, by the terminal, a symbol length in the scheduling instruction; and
determining, by the terminal, the start position of the first time domain resource according to the target reference symbol and the offset information, and determining the number of symbols in the first time domain resource according to the symbol length.

6. The method of claim 1, wherein the terminal determining the first time domain resource according to the target reference symbol and the scheduling instruction comprises:
obtaining, by the terminal, the offset information and the symbol length in the scheduling instruction; and
determining, by the terminal, the start position of the first time domain resource according to the target reference symbol and the offset information, and determining the number of symbols in the first time domain resource according to the symbol length.

7. A resource indication method on an unlicensed spectrum, comprising:
sending a scheduling instruction by an access network device to a terminal, wherein the scheduling instruction is configured to inform the terminal of a first time domain resource, the first time domain resource is a time domain resource configured to transmit data, and a start position of the first time domain resource is obtained based on a second time domain resource, and the second time domain resource is a time domain resource configured to transmit the scheduling instruction,
wherein the first time domain resource is determined according to the scheduling instruction and the target reference symbol, and the target reference symbol is configured to determine the start position of the first time domain resource; and
the target reference symbol is indicated to the terminal through the second time domain resource, or the target reference symbol is indicated to the terminal through the indication information in the scheduling instruction after the target reference symbol is determined by the access network device based on the second time domain resource,
wherein the method further comprises:
determining, by the access network device, index information corresponding to the target reference symbol according to a correspondence as the indication information, wherein the correspondence is configured to indicate the relationship between the index information and the target reference symbol.

8. The method of claim 7, further comprising:
configuring, by the access network device, the correspondence for the terminal.

9. The method of claim 7, further comprising:
obtaining, by the access network device, coding information by coding the target reference symbol into bitmap, and determining the coding information as the indication information.

10. The method of claim 7, further comprising:
generating the scheduling instruction by the access network device, wherein the scheduling instruction comprises the indication information, offset information, and symbol length; and
the indication information is configured to indicate the target reference symbol, the start position of the first time domain resource is determined based on the target reference symbol and the offset information, and the number of symbols in the first time domain resource is determined based on the symbol length.

11. The method of claim 7, further comprising:
generating the scheduling instruction comprising a symbol length by the access network device; wherein
the number of symbols in the first time domain resource is determined based on the symbol length, the start position of the first time domain resource is determined according to the target reference symbol and the offset information, and the target reference symbol and the offset information are determined by the terminal by default according to the second time domain resource.

12. The method of claim 7, further comprising:
generating the scheduling instruction comprising offset information and a symbol length by the access network device, wherein
the number of symbols in the first time domain resource is determined based on the symbol length, and the start position of the first time domain resource is determined according to the target reference symbol and the offset information, and the target reference symbol is determined by the terminal by default according to the second time domain resource.

13. A terminal, comprising:
a processor;
a memory for storing instructions executable by the processor; wherein,
the processor is configured to:
receive a scheduling instruction sent by an access network device; and
determine a first time domain resource according to the scheduling instruction, wherein the first time domain resource is a time domain resource configured to transmit data, a start position of the first time domain resource is obtained based on a second time domain resource, and the second time domain resource is a time domain resource configured to send the scheduling instruction,
wherein determining the first time domain resource according to the scheduling instruction comprises:

determining a target reference symbol according to the second time domain resource or indication information in the scheduling instruction, wherein the target reference symbol indicated by the indication information is determined by the access network device based on the second time domain resource, and the target reference symbol is configured to determine the start position of the first time domain resource; and determining the first time domain resource according to the target reference symbol and the scheduling instruction, wherein the indication information comprises index information, and determining the target reference symbol according to the indication information in the scheduling instruction comprises:

obtaining the index information in the scheduling instruction by the terminal, and determining the target reference symbol corresponding to the index information according to a correspondence indicating a relationship between the index information and the target reference symbol.

14. An access network device, comprising:
a processor;
a memory for storing instructions executable by the processor; wherein,
the processor is configured to implement a resource indication method on an unlicensed spectrum of claim 7.

15. A resource indication system on an unlicensed spectrum, comprising the terminal of claim 13 and the access network device of claim 14.

16. A non-transitory computer-readable storage medium, wherein the storage medium stores at least one instruction, at least one program, a code set or an instruction set, the at least one instruction, the at least one program, the code set or the instruction set are loaded and executed by a processor to implement the resource indication method on an unlicensed spectrum of claim 1, or the at least one instruction, the at least one program, the code set or the instruction set are loaded and executed by the processor to implement the resource indication method on an unlicensed spectrum of claim 7.

* * * * *